June 3, 1969     M. H. NEEB     3,447,271
END MILL FIXTURE
Filed Aug. 18, 1966
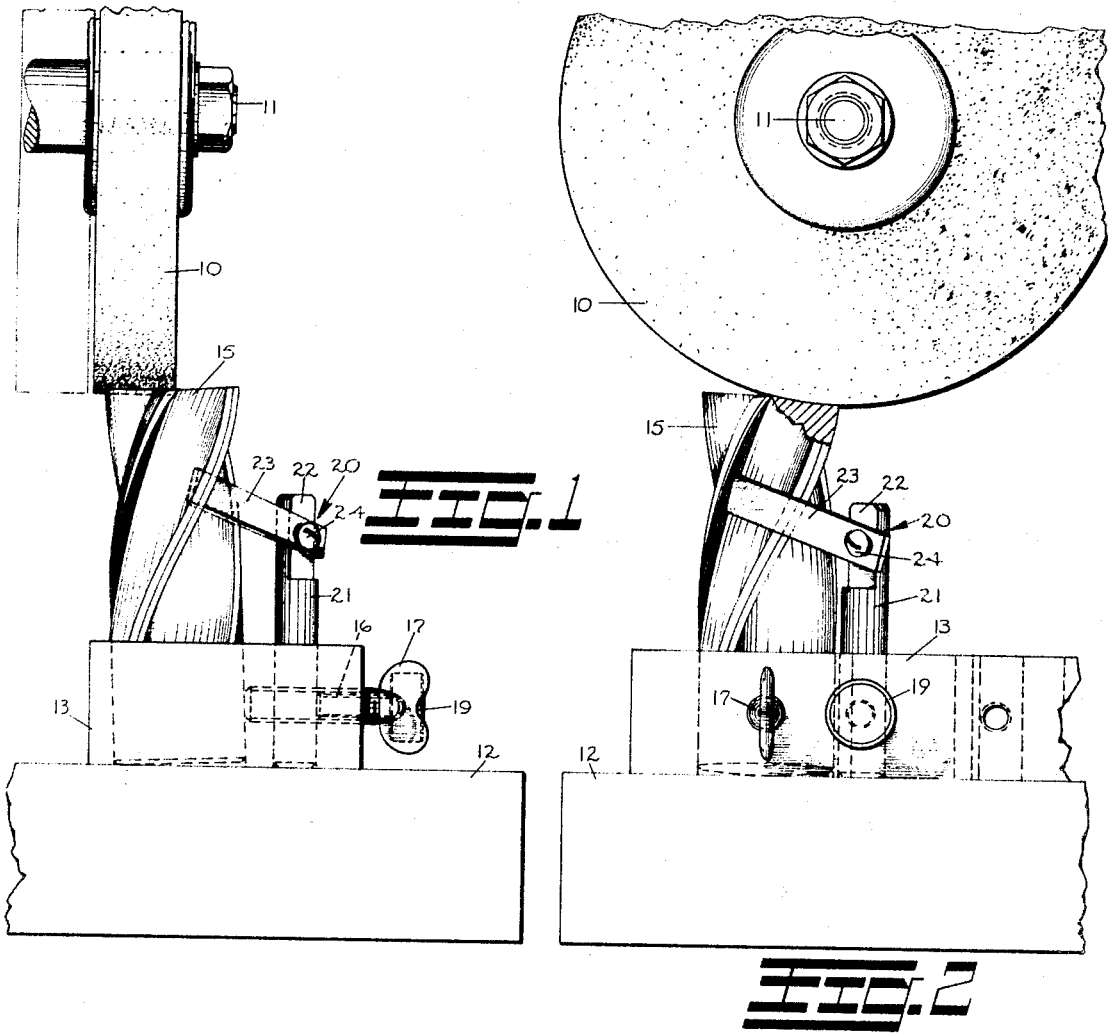
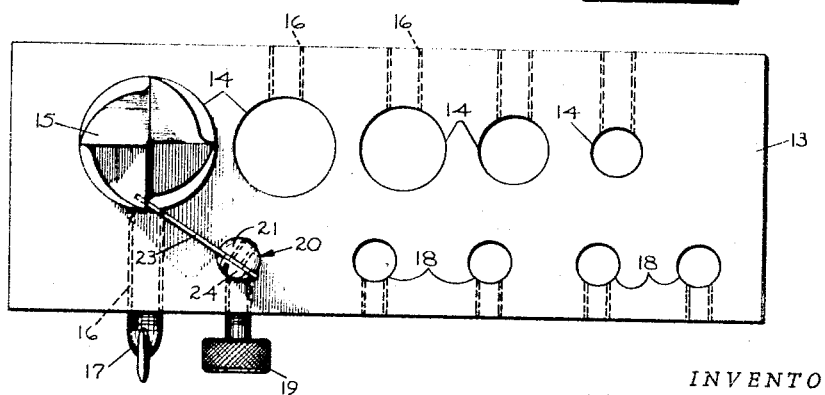
INVENTOR.
MILTON H. NEEB
BY
ATTORNEY

3,447,271
END MILL FIXTURE

Milton H. Neeb, Canandaigua, N.Y., assignor to Stone Conveyor Company, Inc., Honeoye, N.Y.
Filed Aug. 18, 1966, Ser. No. 573,291
Int. Cl. B24b 3/06
U.S. Cl. 51—225            1 Claim

ABSTRACT OF THE DISCLOSURE

A fixture for supporting end mills of different sizes for grinding including a support block with a plurality of different size openings for receiving the shank of the tool and indexing means to locate the tool in proper position.

---

This invention pertains to a holding fixture for end mills and, more particularly, to such a fixture for supporting said end mills on a surface grinder for sharpening the cutting edges thereof.

It is a general object of the invention to provide a relatively simple and inexpensive holding or grinding fixture for fixedly and accurately positioning the cutting edges of end mills during the sharpening of said edges.

A further object is to provide a grinding fixture which is capable of accommodating a variety of sizes of end mills.

A still further object is that of providing a grinding fixture having an indexing device which may be positioned selectively to cooperate with end mills of varying size and which will accurately position the cutting edges of the latter for sharpening by the surface grinder.

Another object of the invention is to provide a grinding fixture in which an end mill is supported at an angle sufficient to provide clearance at the center of the cutter when the latter is moved into position to be acted upon by the grinding wheel of the surface grinder.

Further objects and advantages of the invention will become apparent from the following more detailed disclosure.

End mills are commonly sharpened by means of some sort of holding fixture that is suitably attached to the table of a surface grinder by such means as clamping or a so-called magnetic chuck. This table is caused to move a pre-set distance which is sufficient to cause one of the cutting edges of the end mill to be acted upon by the rotating grinding wheel of the grinder. After one cutting edge has been sharpened the end mill is rotated a sufficient distance so that when the cycle is repeated the other or next cutting edge will be acted upon by the grinding wheel. The number of cycles to which an end mill is subjected depends of course on the number of cutting edges which may be two or more.

According to the present invention a novel holding fixture can now be provided for supporting and accurately positioning an end mill for the sharpening of its cutting edges by a surface grinder.

This fixture includes a generally rectangular block member having a plurality of aligned openings of graduated sizes which are adapted to receive therein end mills of corresponding diameters. Cooperating with each opening the block member includes an equal number of horizontally disposed threaded holes each of which extend inwardly from the side of the block to its respective opening. A thumb screw is receivable into these threaded holes and when tightened against an end mill it serves as a set screw for fixedly positioning said end mill in that particular opening.

The plurality of aligned openings are formed on a slight angle to the vertical and so position an end mill as to provide clearance at the center of the latter when it is moved into position to be acted upon by the grinding wheel.

An indexing means is also provided for accurately positioning each cutting edge of an end mill prior to its being acted upon by the grinding wheel.

This indexing means includes a plurality of aligned openings of equal diameter each of which extend in a plane parallel to the end mill openings and are disposed in spaced relation to the latter with each of the openings being individual to one of said end mill openings.

A stud member is adapted to assemble in anyone of these openings depending on which end mill opening is being utilized.

The stud extends upwardly from the block member and is provided adjacent its upper end with an angularly extending flexible indexing arm which is adapted to contact the fluted portion of an end mill and when so doing is so arranged as to place one of the cutting edges of said end mill in position for sharpening. For placing the next cutting edge in position for sharpening the thumb screw is simply loosened and the end mill rotated until the indexing arm comes into contact with the next fluted portion and said thumb screw retightened. The procedure is followed until all cutting edges have been positioned and ground as desired.

The invention will be described in detail by reference to the specific embodiments thereof which are illustrated in the accompanying figures of drawing, wherein:

FIG. 1 is a view of a portion of a surface grinder showing the end mill holding fixture according to the invention positioned thereon;

FIG. 2 is a view in side elevation of the device shown in FIG. 1; and

FIG. 3 is a plan view of the holding fixture illustrated in FIGS. 1 and 2 showing the plurality of openings for accommodating end mills of different sizes and the indexing means for accurately positioning the cutting edges of said end mills.

Now referring to FIGS. 1 and 2 a portion of a surface grinder is shown which includes among other known parts a grinding wheel 10 that is supported for rotation on a spindle 11. Such grinders commonly include clamping arrangements such as a magnetic chuck 12 which is adapted to fixedly position work pieces on and to move with a reciprocating table (not shown) all of which is well known in the machinist field.

The holding fixture according to the invention includes a generally rectangular block 13 having a plurality of aligned openings 14 of graduated sizes formed therein. Each of these openings is adapted to support therein an end mill 15 of corresponding diameter (one only shown in FIGS. 1, 2 and 3).

Cooperating with each of the openings 14 there is provided a horizontally disposed threaded hole 16 (FIG. 3) which extends from the side of the block 13 and is adapted to receive therein a thumb screw 17.

The thumb screw 17 is assembled in the threaded hole 16 which is individual to the particular opening 14 being utilized and by tightening it against the shank of an end mill, the latter is firmly held in position for sharpening.

Block 13 also includes a plurality of aligned openings 18 of equal diameter each of which are individual to one of the openings 14 with each being disposed in spaced relation to the latter.

As is provided for openings 14, openings 18 also include a horizontally disposed threaded hole 19 which extends from each of said openings 18 to the side of the block 13 (FIG. 3).

A screw 19 is adapted to assemble in the threaded hole 19 of its respective opening 18 for fixedly positioning an end mill indexing element therein now to be described.

This indexing element is identified generally in FIGS. 1, 2 and 3 by numeral 20 and includes a stud member 21 having a slabbed planar surface 22 forming the upper end thereof. Stud member 21 is selectively assembled in any one of the openings 18 and is fixedly positioned therein by simply tightening the screw 19.

A flexible indexing arm 23 is adjustably attached at one end to the planar surface 22 of the stud member 21 by means of a screw 24 and extending obliquely from its attachment point the opposite end of said indexing arm is adapted to engage the fluted portion of the end mill 15 as shown in FIGS. 1, 2 and 3.

The openings 14 are formed at a slight angle to the vertical as shown in FIGS. 1 and 2 and supports an end mill at the required angle to provide clearance at the center thereof when its cutting edges are moved into a position to be acted upon by the grinding wheel 10.

In operation, an end mill to be sharpened is placed in the particular opening 14 corresponding in size thereto and stud 21 is assembled in the opening 18 individual to this opening 14. The flexible indexing arm is then adjusted and tightened in a position which positions the end of said arm in contact with one of the fluted portions of the end mill. The end mill and stud member 20 are fixedly positioned by tightening screw 17 and 19, respectively. With the block 13 being in proper position on the magnetic chuck 13 it is then caused to be moved into position for sharpening one of the cutting edges of the end mill. To sharpen the next cutting edge thumb screw 17 is loosened and the end mill is rotated manually until the flexible indexing arm 23 comes into contact with the next fluted portion and by retightening thumb screw 17, it firmly holds said end mill while it is being acted upon by the grinding wheel. This procedure is repeated until all cutting edges have been sharpened.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:
1. A grinding fixture for supporting end mills for sharpening on a surface grinder comprising
 (a) an end mill support block of generally rectangular formation having a series of aligned openings of graduated sizes extending upwardly therethrough adapted for supporting end mills having diameters corresponding to said openings, said openings being disposed at a slight angle to the vertical,
 (b) locking means for fixedly positioning an end mill in its respective opening, and
 (c) a plurality of apertures spaced from said aligned openings for receiving an indexing means upon said support block at predetermined locations relative to said openings for cooperation with an end mill whereby said mill may be rotated to selected angular positions for accurately sharpening each cutting edge thereof, said indexing means including a stud member lockably fastened in any one of said apertures at said predetermined locations and having a flexible arm attached thereto, said arm being adjustably pivotable for engagement with the fluted portion of said end mills.

References Cited

UNITED STATES PATENTS

| 1,379,370 | 5/1921 | Szatmary | 51—220 |
| 2,803,929 | 8/1957 | French | 51—225 X |
| 3,365,843 | 1/1968 | Robinson | 51—225 |

OTHER REFERENCES

Amer. Machinist, p. 134, September 1945, article entitled "Toolbit Grinding Fixture—Rake."

HAROLD D. WHITEHEAD, Primary Examiner.

U.S. Cl. X.R.

51—220